(No Model.)
C. E. EVANS.
PLOW.
No. 549,507.  Patented Nov. 12, 1895.
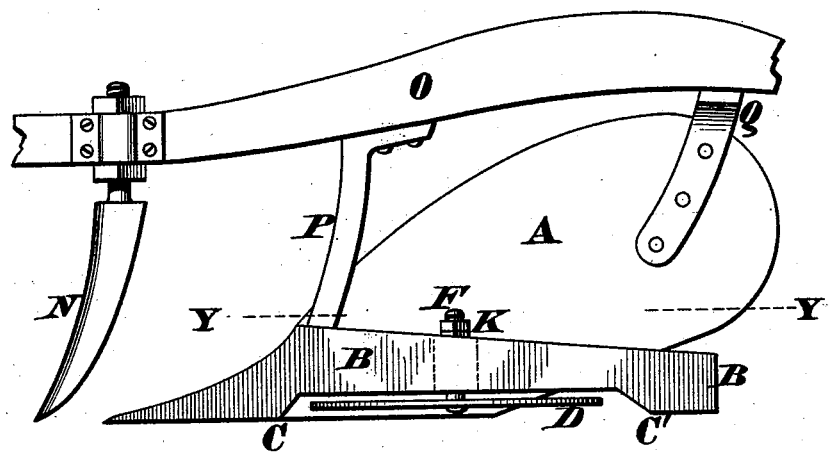
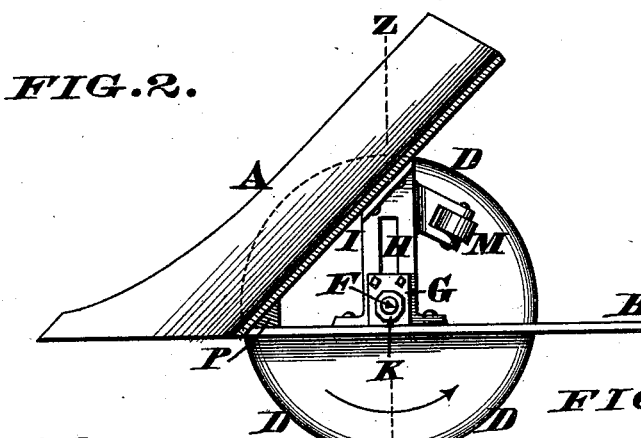
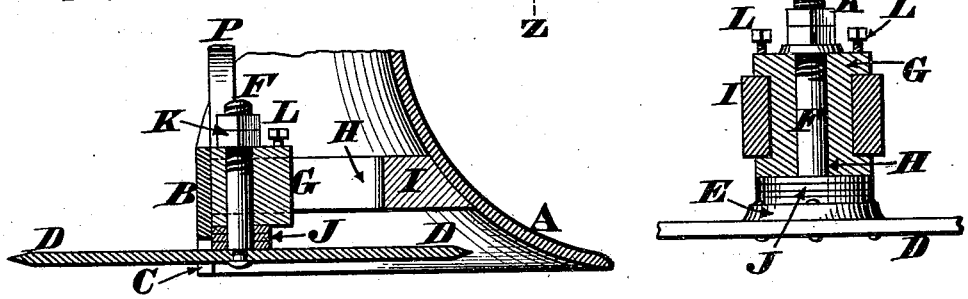
Attest.
Arthur Moore
Ida Heitz
Inventor.
Charles E. Evans.
by James H. Layman.
Atty.

UNITED STATES PATENT OFFICE.

CHARLES E. EVANS, OF THAYER, KANSAS.

PLOW.

SPECIFICATION forming part of Letters Patent No. 549,507, dated November 12, 1895.

Application filed January 21, 1895. Serial No. 535,683. (No model.)

*To all whom it may concern:*

Be it known that I, CHARLES E. EVANS, a citizen of the United States, residing at Thayer, in the county of Neosho and State of Kansas, have invented certain new and useful Improvements in Plows; and I do hereby declare the following to be a full, clear, and exact description of the invention, reference being had to the annexed drawings, which form part of this specification.

My invention consists in providing a plow with an automatically-revolving colter or disk cutter that is substantially horizontal, operates at the landside of the implement, and is capable of being so adjusted as to undermine the soil a greater or less distance, as occasion requires. This colter or disk cutter is rigidly secured to the lower end of a practically vertical stud or shaft, which latter traverses a horizontal bar connecting the land-share and moldboard, the shaft being capable of adjustment up and down for the purpose of raising and lowering the colter, so as to regulate its position with reference to the depth of furrow cut by the implement and cause said disk to sustain the greater part of the downward pressure or weight of the plow, as hereinafter more fully described.

In the annexed drawings, Figure 1 is a landside elevation of a plow embodying my invention. Fig. 2 is a horizontal section of the implement, taken at the line Y Y. Fig. 3 is an enlarged transverse section at the line Z Z. Fig. 4 is a still greater enlarged vertical section through the shiftable journal-bearing of the colter-shaft.

The moldboard A and landside-plate B are of any desired size, shape, and material, the only peculiarity about them being that the lower edge of said landside is removed from C to C' to afford sufficient clearance for the horizontally and automatically-revolving colter D to turn in. This colter or disk cutter is a thin flat steel disk of any suitable diameter and has a sharp periphery capable of readily cutting the soil. Furthermore, this colter is generally bolted or riveted to an annular collar E at the lower end of a short vertical stud or shaft F, as more clearly seen in Fig. 4, the shaft being journaled in a slide G, that can be adjusted within a longitudinal slot H of a bar I, connecting the moldboard A and landside B in the manner represented in Fig. 2.

J are thin washers under this shiftable journal-bearing G, and K are nuts on the upper or threaded end of shaft F, which devices J K enable a very accurate vertical adjustment of said shaft for the purpose of keeping the colter D in its proper position below the moldboard and land-share of the plow.

L L are set-screws or other convenient fasteners that retain the slide G to any specific adjustment within the slot H; but the appliances for regulating the lateral and vertical shifting of the colter may be varied to suit circumstances.

M is a small antifriction-roller journaled in a bearing that projects laterally from the rear side of the cross-bar I.

N is an ordinary colter located in front of the plowshare. O is a plow-beam to which said share is attached by connections P Q.

Before using my plow the sliding journal-bearing G must first be adjusted within the slot H to cause the colter D to project the desired distance beyond the landside B, according to the "undercut" required, which undercut will vary considerably and be determined by the nature and condition of the soil and the peculiar views of the farmer.

When the implement is drawn forward, it is evident the colter D will penetrate the soil horizontally as far as the landside B will permit, automatically revolving in the direction of the arrow seen in Fig. 2, the result being a very material decrease in the pressure of the plow against the land, while at the same time a portion of the succeeding furrow is cut. Again, as the colter revolves in a practically horizontal plane slightly above the bottom of the furrow, owing to said device D being located within the cut-away portion C C' of the landside, it is apparent there is no such severe friction as attends the use of an ordinary plow provided with a fixed sole-plate under the share.

In the drawings a fixed colter N is shown in advance of the plowshare; but the invention is not restricted in this respect, as a revolving colter can be used, if desired, and in certain cases the landside B can be omitted.

My improvement can be applied to all kinds of plows, but is more especially designed for that class of implements commonly known as "riding-plows."

Finally, in this specification the adjective "horizontal" as applied to the colter D is used in its general sense and must not be construed so rigidly as not to include a slight tilting of said device in case its shaft F should become somewhat inclined or the cross-bar I be improperly fitted between the moldboard A and land-share B.

I claim as my invention—

1. A plow-share having a single, horizontal and automatically-revolving disk-cutter secured to a vertically-adjustable shaft, and projecting beyond the land-side plate; a laterally-shiftable bearing within which said shaft is journaled, and a set-screw for holding said bearing to any specific adjustment, substantially as described.

2. The combination, in a plow, of the mold board A, having a vertical-plate, or land-side B; a cross-bar I, connecting said board and plate, and slotted longitudinally at H; a slide G traversing said slot; an upright shaft F, journaled in said slide; a single, horizontal and automatically-revolving disk-cutter D secured to the lower end of said shaft, and set screws L L for holding said slide in place, the cutter D having no bearing below it, and being so arranged as to penetrate the land side of a furrow, substantially as herein described.

In testimony whereof I affix my signature in presence of two witnesses.

CHARLES E. EVANS.

Witnesses:
GRACE BODINE,
HENRY CRAM.